INVENTOR.
HARRY R. VAN DEVENTER
BY
VanDeventer & Shively
ATTORNEYS

INVENTOR.
HARRY R. VAN DEVENTER
BY
Van Deventer & Shively
ATTORNEYS 2,793,251

United States Patent Office 2,793,251

Patented May 21, 1957

2,793,251

SIGNALLING APPARATUS

Harry R. Van Deventer, New York, N. Y., assignor to Telephone Answering and Recording Corporation, New York, N. Y., a corporation of Delaware Application April 2, 1952, Serial No. 280,046

23 Claims. (Cl. 179—6)

This invention relates to signalling apparatus for recording phonographs where a tone signal commonly called a "beep" note is impressed on a telephone line circuit having a recording phonograph connected thereto in order to warn the calling party that their conversation is being recorded. This is required by the Federal Communications Commission, and the standard signal is a 1400 cycle tone plus or minus 3% applied for not more than .2 second at intervals of about 15 seconds during the recording period—preferably with one signal just as the recording begins.

Heretofore such signals have been obtained by mechanical interrupters or by electronic devices. The former are difficult to maintain as they employ contacts that must be moved rapidly to obtain a 1400 cycle note; the latter employ electronic devices including tubes and the signal is subject to variation in strength and often in frequency due to changes in the voltage applied to the tubes and for other well known reasons.

The principal object of the present invention is to eliminate all moving contacts in the tone-signal generator and all tubes, condensers, and complicated circuits necessary where electronic generators are employed, and to provide a more simple and durable generator than heretofore available.

Another object is to provide a tone-signal generator that is easily combined with and operated by the motor of the recording phonograph instead of being a separate piece of apparatus such as the "Recorder Connector" boxes now in common use which are spaced apart from the phonograph and must be connected to the telephone line, the phonograph and a source of current for their operation. The generator herein described may be assembled as a part of the phonograph and enclosed in the casing thereof.

Further objects and advantages will be apparent from the following specification, wherein is shown by way of illustration, preferred forms of the invention. It will be understood, however, that the invention is not limited to the specific forms or arrangement of parts herein shown and described, as many modifications can be made, the invention being as defined in the appended claims.

While the present invention is used with combined telephone answering and recording devices, such, for example, as disclosed in the co-pending application Ser. No. 30,538, filed June 2, 1948, as the tone signal is used mainly during recording only, the following description omits any reference to the answering cycle of such devices as same is not necessary to a proper understanding of this invention.

Figure 1:
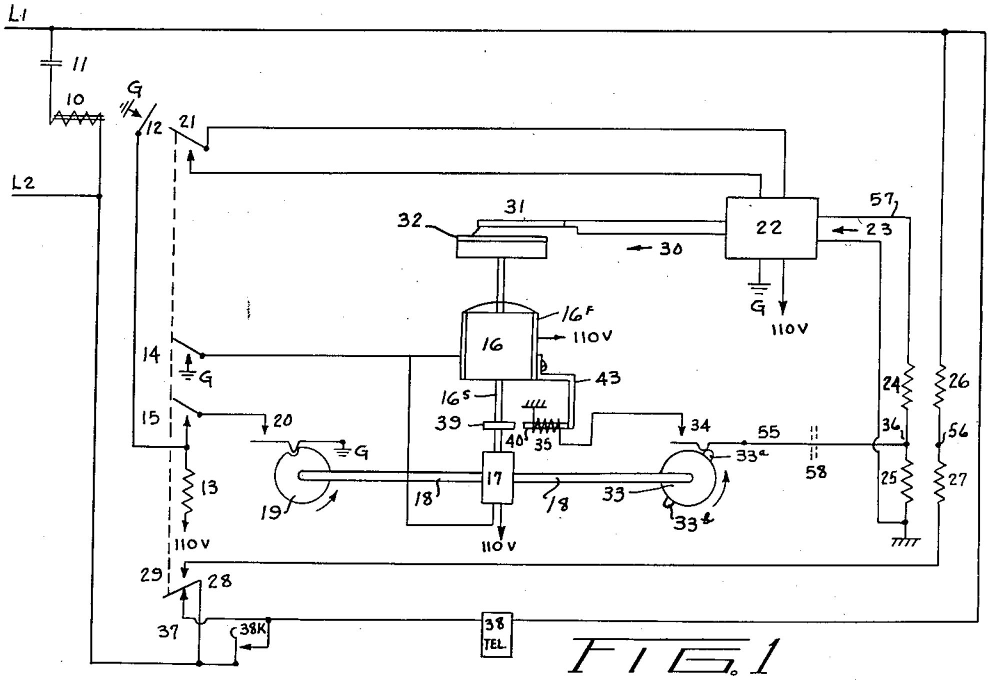
Fig. 1 is a circuit diagram showing this invention applied to a recorder for recording telephone conversations.

Referring to Fig. 1, for the sake of simplicity the 110 v. 60 cycle power circuit or current supply is shown one side grounded as shown at G, and the other side marked "110 v." at various points in the drawing. It will be understood, however, that the apparatus is wired up in the usual manner—metallic circuits throughout. Line wires L1, L2, are the usual telephone line circuit and the line shown may be considered as terminating at the left of the drawing in a common battery exchange, either manual or automatic.

A ringing relay or signal-receiving device 10 in series with the usual condenser 11 is connected across L1, L2, and when the ringing current (usually 80 v. at 20 cycles) is applied to the line, relay 10 closes contact 12, while ringing current is applied to the relay. This closes the 110 v. circuit through starting relay 13 which closes its contacts 14, 15, 21 and 28 to 29. Contacts 14 complete the power circuit through motor 16 and magnetic clutch 17.

Clutch 17 is of any suitable construction and many types are in common use. This operates when energized to connect motor shaft 16[s] to a shaft 18 carrying cams 19 and 33. These cams are shown in the normal at-rest position in the drawings, and when moved to operative position as hereinafter described, the clutch is de-energized and the shaft 18 is automatically reset to return the cams to normal starting position.

When contacts 14 close, as above described, and the clutch motor 16 begins to move and clutch 17 is operated, cam 19 closes its contact 20 and the power circuit is closed through said contacts and relay 13, which is therefore locked in circuit via contact 15, and is thereafter independent of relay 10 until cam 19 opens contact 20 which occurs after some predetermined time interval—say 30 seconds—which constitutes the recording period. Contact 21 of relay 13 closes the plate circuit of amplifier 22, the input circuit 23 of which is connected in series with windings 24, 25, of a repeating coil, the windings 26, 27, of same being connected across L1, L2, via contacts 28, 29, on relay 13 and serves (on a common battery line) as a holding coil. The output circuit 30 of the amplifier is connected to the recording head 31 which records on record 32 rotated in the usual manner by motor 16. Obviously any suitable recorder using wire, tape or any other recording medium can be used.

As soon as shaft 18 begins to revolve, the cam 33 by lobe 33[a] thereon, operates to close contact 34 which connects the tone generator 35 (hereinafter described in detail)—via contact 34—to the center tap 36 of the repeating coil, and as the dwell of contact 34 is .2 second, a signal of that duration is impressed on the coil and by induction, via windings 26, 27, is heard by the calling party on L1, L2. At the same time, this tone is impressed via amplifier 22 and recording head 31 on record 32.

After any desired interval—say 15 seconds—a second tone signal is produced by the second lobe 33[b] on cam 33 operating contact 34 and this imposes a .2 second signal on L1, L2, and on the record 32 as previously described. When the cam 19 has revolved through its 30 second period, contact 20 opens, thereby releasing relay 13 which opens all its contacts, thereby stopping motor 16 and restoring all circuits to normal position awaiting the next call. The cam 33 and its associated contacts constitute an automatically resetting contact mechanism adapted to connect the signal tone generator 35 to the phonograph at predetermined intervals.

Normally contact 28 rests against contact 37 so that the telephone instrument 38 is normally connected to L1, L2, but the telephone is disconnected from the line as soon as relay 13 operates and the recorder is in operation.

Figure 4:
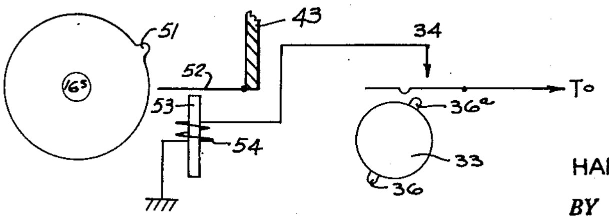
Fig. 4 illustrates another modified form of tone-signal generator.

If it is desired to record two-way, the key 38K is closed, whereupon the telephone 38 is connected across the line and speech therefrom may be recorded on record 32 as well as speech from the calling party. The telephone 38 is of any suitable type, having the usual transmitter, receiver, hook switch and other parts. The signal tone generator 35, Fig. 1, may be of any suitable type, and suitable generators are shown in Figs. 2 to 4 inclusive.

Figures 2, 3:
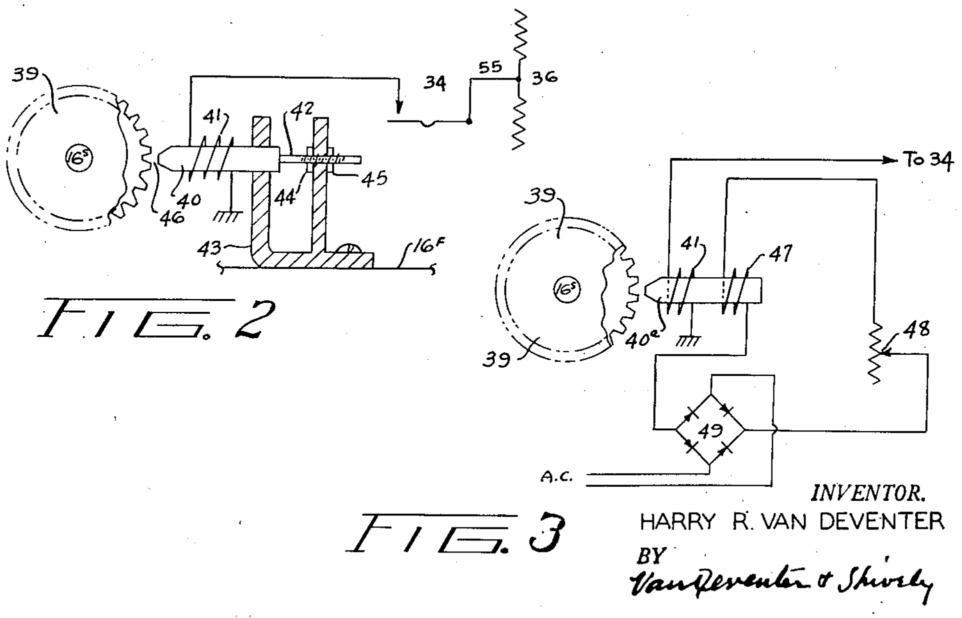
Fig. 2 illustrates one form of the tone-signal generator 35 of Fig. 1, embodying this invention.
Fig. 3 illustrates a modified form of the tone-signal generator, Fig. 2.

Referring to Fig. 2, motor shaft $16^s$ carries a toothed wheel 39, the number of teeth in same being dependent upon the speed of the shaft.

Let:

S=Motor speed (R. P. Second)

C=Cycles per second of the tone signal desired

T=Necessary number of teeth with which to produce 1400 cycle note—then $$ST=C \text{ and } \frac{C}{T}=S$$

For example: A shaft $16^s$ at a standard motor speed—common use of 1625 R. P. M.=(about 27+R. P. Sec.)—would require a rotor wheel with 52 teeth which would give 1404 C. P. S.—within the desired range and allow for variations in speed of a suitable motor.

Adjustably mounted adjacent the periphery of wheel 39 is the stator core 40 having thereon a suitable winding 41. The shank of 40 is threaded at 42 and passes through a suitable fixed support 43, and by means of nuts 44, 45, the core may be brought nearer to or farther away from wheel 39, thereby adjusting the air gap 46 to increase or diminish the intensity of the signal current generated as the wheel revolves in front of core 40. This device is in effect a small A. C. generator and may deliver 1 or 2 volts to point 36 on the repeating coil to act as previously described.

Either wheel 39 or core 40, or both, may be permanent magnets in one form of the device.

Referring to Fig. 3, another form of tone signal generator is shown. Here core $40^a$ may be adjustable as described in connection with core 40, Fig. 2, or may be fixed relative to wheel 39. In either case the core is preferably of soft iron and has the winding 41 thereon which acts as previously described in connection with Fig. 2. In addition, there is provided an exciting winding 47 connected through variable resistance 48 to a suitable rectifier 49 adapted to deliver direct current to the coil. (If desired, any source of direct current can be substituted for the rectifier.) By adjusting the resistance 48, the magnetism of core $40^a$ is varied and consequently the output of winding 41 is varied to vary the strength of the signal tone current delivered to point 36 in the voice current.

Referring to Fig. 4, another suitable signal-tone generator is shown, where the cam 50 is mounted on shaft $16^s$ and revolves therewith. This cam has a lobe 51 adapted to deflect and release a reed 52 tuned to 1400 cycles per second. This reed is located to vibrate adjacent the end of a core 53 having a winding 54 thereon. This core and winding may be core 40 and winding 41, Fig. 2, or core $40^a$ and windings 41, 47 of Fig. 3.

The cam 50 is so set that the lobe 51 thereof will deflect the reed 53 and release same to vibrate freely in front of core 53 during the .2 second intervals during which contact 34 is closed by the lobes $33^a$, $33^b$, on the timer cam 33; thus the tone signal is introduced to the voice circuits at 36 as previously described, as the current generated in coil 54 is at the frequency of the vibrations of reed 52 in the magnetic field of core 53.

While the tone-signal is shown as connected to the voice circuits at 36, it will be understood that it can be connected thereto either indirectly, or directly, or through a condenser. For example, the conductor 55, Fig. 1, may connect to the point 56 on the line side of the repeating coil or directly to L1 or L2 or to conductor 57 on the input side of the amplifier 22 and conductor 55 may have a condenser or resistance in series therewith, as indicated at 58 which may be variable in order to adjust the output of the generator.

Figure 5:
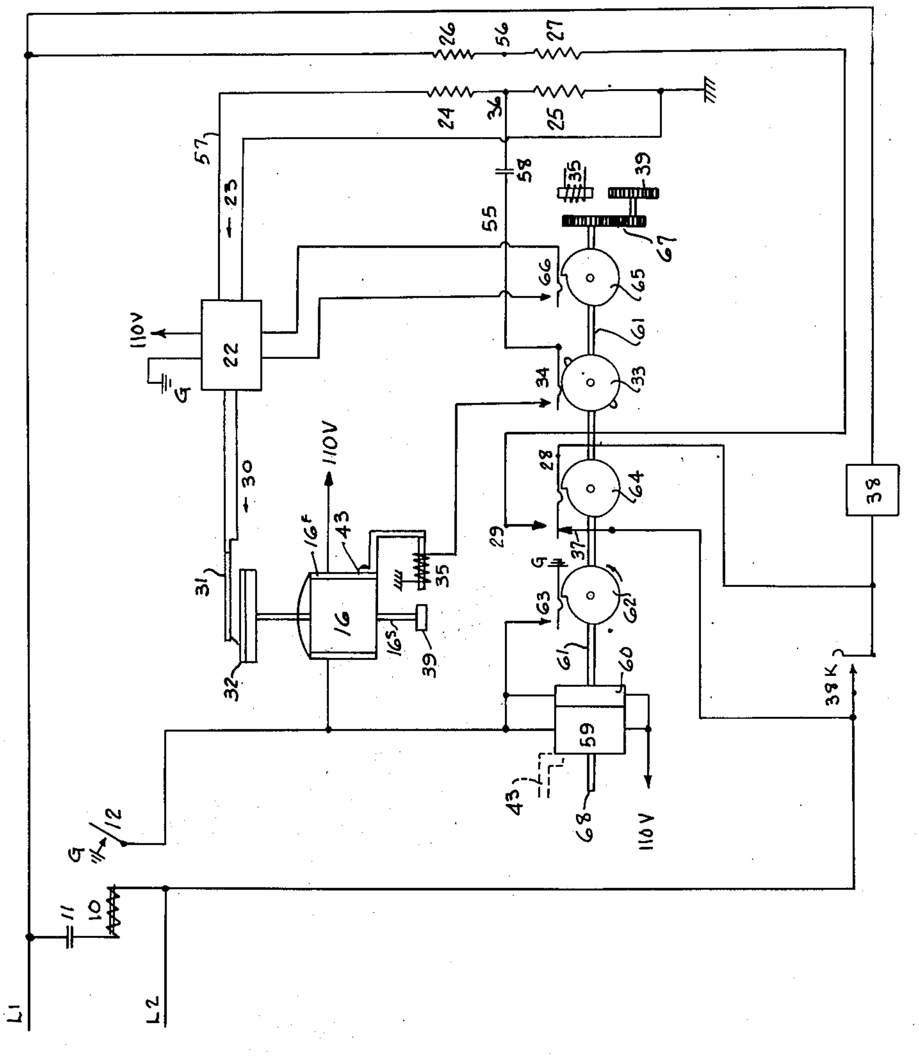
Fig. 5 is a circuit diagram similar to Fig. 1 but disclosing a separate timer motor for operating certain parts of the apparatus.

Fig. 5 illustrates a modified arrangement of the apparatus. Here a timer motor 59 has a resetting clutch 60 which operates same as the clutch 17 of Fig. 1 previously described.

When ringing relay contacts 12 close, the power circuit through motor 59 and clutch 60 is completed and the motor starts and shaft 61 via cam 62 closes contact 63 completing the power circuit through motor 59 and clutch 60 independently of contact 12 of relay 10. The cam 62 holds contact 63 closed for the recording period, and when contact 63 opens, the motor 59 and clutch 60 are disconnected from the power circuit and remain ready awaiting the next operation of relay 10.

Cam 64 operates the contacts 28, 29, 37, to switch the telephone 38 same as described in connection fith Fig. 1.

Cam 33 operates contact 34 same as described in connection with Fig. 1.

Cam 65 operates contacts 66 to close the plate circuit of amplifier 22 and operate same as contacts 21 in Fig. 1. The operation of this circuit, Fig. 5, is the same as that shown in Fig. 1 except the motor 16 does not operate the timing cams and relay 13 is dispensed with.

Instead of operating the tone signal generator 35 from shaft $16^s$, it may be operated from timer shaft 61 by suitable gearing 67 instead of from shaft $16^s$ of motor 16, as shown at the extreme right end of shaft 61, Fig. 5.

Instead of operating the tone signal generator 35 from either shaft $16^s$ or 61, the rotor 39 thereof may be operated by the shaft 68 of the timer, which may be connected directly to the rotor shaft thereof, and thereby directly drive rotor 39 of the generator at synchronous speed, same as when shaft $16^s$ is used, thereby eliminating gearing 67.

Timer motors such as 59 as is well known, may have a shaft 68 which runs at some definite speed relative to the 60 cycle current applied to the motor. It is, therefore, merely necessary to provide the rotor 39 with the necessary number of teeth to produce the 1400 cycle note desired, in accordance with the calculations given for rotor 39 used in Fig. 1.

The shaft 61 in timer motors is usually geared down from the motor rotor to make the speed of said shaft the desired speed of the cams 62, 64, 33, 65, thereon, which in this illustration here given is 30 seconds, with a small additional allowance to permit the contact springs operated by said cams to drop off and come to rest with the circuits open. Thus, when the motor 59 is pulsed by contact 12 on relay 10, contact 63 will close with very little movement of cam 62.

As the construction and operation of such timer motors as 59, clutch 60 and the cams and contacts operated thereby, are well known, they are not described in detail.

It will be understood that none of the drawings herein are to scale, but as illustrative of the relative size of the tone-signal generators, it may be said that the average rotor 39 may be 2" in diameter and ¼ inch thick and the cores 40, $40^a$, or 53, ¼" diameter and 1" long, so that the entire generator is easily mounted on a suitable support 43 which may be easily attached to the frame $16^f$ of motor 16, or attached to the casing of motor 59 or mounted adjacent shaft 61. Such a tone-signal generator is therefore compact and easily mounted in the recording apparatus, such as that described in the co-pending application heretofore mentioned.

In cases where it is not desired to have the phonograph responsive to the relay 10, it and condenser 11 are omitted, and contacts 12 replaced by an ordinary push button which—when pressed—will operate in the same manner as contact 12 to start the apparatus through its cycle.

This button then becomes the equivalent of the signal-receiving device 10 as it is manually operated to produce the same effect.

The apparatus can then be used, employing telephone 38 to record speech accompanied by the signal tones impressed on the record, or any speech-producing device. Another telephone or a reproducing phonograph, or radio pick-up, can be connected to L1, L2, if desired.

What is claimed is:

1. Signalling apparatus for a recording phonograph including in combination, a signal-receiving device; a motor controlled by said device; a recording phonograph driven by said motor and having a speech circuit; an amplifier connected to said speech circuit of said phonograph and having input and output circuits, a tone-signal generator including a movable current generating member driven by said motor; and a coil adjacent said member having a core spaced-apart from said member to form an air gap therebetween and subject to changes in flux produced by the movement of said member, said coil being connected to said amplifier.

2. The combination as claimed in claim 1 wherein said motor operates at substantially constant speed and said member comprises a wheel having a toothed periphery adapted to cause flux changes in said core to produce current changes in said coil in a fixed predetermined ratio to the speed in revolutions per minute of said motor.

3. The combination as claimed in claim 1 wherein said movable member comprises a vibratory reed adjacent said coil and including means operated by said motor to pluck said reed at intervals in a fixed predetermined ratio to the speed of said motor.

4. The combination as claimed in claim 1, including means for varying said air-gap between said movable member and said core of said coil.

5. The combination as claimed in claim 1, including a source of current a timer connected to said source of current; means including contacts in said signalling device for completing a circuit including said current source and said timer to start operation of the timer; and contacts in said timer serially including said current source and said motor whereby said last contacts control the operation of said motor and said signal tone generator.

6. The combination as claimed in claim 1, including a contact mechanism operated in timed relation to revolutions of said motor and having contacts included in circuit with said coil to complete a circuit therefrom to said input circuit of said amplifier at predetermined intervals.

7. The combination as claimed in claim 1 including a source of current for operating said motor and amplifier, a second winding on said core, a rectifier connected to said current source and connected to said second winding to energize same with D. C. current, and means for varying the current flowing through said second winding and thereby vary the degree of magnetization of said core.

8. Signalling apparatus for a recording phonograph including in combination, a motor; a tone signal generator having a movable current generating member driven by said motor; a coil adjacent said member having a core subject to changes in flux produced by the movement of said member; a recording phonograph having a record and means including a speech circuit for recording signal-tones produced by said tone-signal generator on said record; and a circuit having therein an automatically resetting contact-mechanism adapted to connect said signal-tone generator to said speech circuit of said phonograph at predetermined intervals.

9. The combination as claimed in claim 8 including a second coil in magnetic relation to said core; and a source of current connected to said second coil.

10. The combination as claimed in claim 8 wherein said core comprises a permanent magnet.

11. Signalling apparatus for a recording phonograph including in combination, a repeating coil having a first winding, means responsive to telephone ringing current for connecting said first winding of said coil to a telephone line circuit, a second winding on said coil having a center tap, a motor, a phonograph driven by said motor and having a speech circuit connected to said second winding, and means including a tone generator connected to said center tap to deliver to said second winding a signal-tone current, and means for starting and stopping said generator coincident with the starting and stopping of said motor.

12. Signalling apparatus for a recording phonograph including in combination, a signal receiving device; a relay controlled thereby, said relay having contacts; a repeating coil having a winding; a circuit including one of said windings and said contacts on said relay; a circuit including additional contacts on said relay, a motor and a source of current; a phonograph connected to said motor for operation thereby; a second winding on said repeating coil connected to said phonograph; and means connected to said second winding to deliver thereto a signal tone current whereby said signal tone may be recorded on a record in said phonograph.

13. The combination as claimed in claim 12 wherein said last means includes a circuit connected to said second winding, said circuit serially including a signal-tone generator, and switch means for intermittently connecting same to said last-mentioned circuit.

14. In combination, a phonograph having a motor and a speech circuit; a communication circuit; a source of current; a timer motor having a shaft connected to said source of current; and contacts operated by said timer motor shaft for connecting said speech circuit of said phonograph to said communication circuit during operation of the timer; a tone-signalling generator; and means comprising a circuit including said generator and a second pair of contacts in said timer and said communication circuit for connecting said generator to said phonograph and to the communication circuit connected thereto.

15. Signalling apparatus for a recording phonograph including in combination, a phonograph having a motor and a speech circuit; a timer having a shaft; a telephone; a telephone line circuit normally connected to said telephone; a circuit connected to said telephone and said line circuit; contact means in said last circuit operated by said timer shaft for disconnecting said telephone from said circuit while said phonograph is in operation; a second contact means operated by said timer shaft for connecting said line circuit to said phonograph while said timer is in operation; a tone-signal generator; means including a circuit connected to said generator and to said telephone line circuit and a third set of contacts in said timer for connecting said generator to said telephone line circuit; a source of current; a control circuit serially including the said current source, said control circuit and said timer; and means connected to said telephone line for operation by current flowing thereover, including contacts to close said control circuit to start the operation of said timer.

16. The combination as claimed in claim 15, wherein said last means includes a repeating coil having a winding connected to said circuit and another winding connected to said phonograph, whereby said tone-signal is impressed on said circuit and recorded by said phonograph.

17. Signalling apparatus for a recording phonograph including in combination, a sound recording device including a motor; a timer serially included in a power circuit with said motor for determining the duration of a recording connected to said device and pre-set to operate for said duration; a tone-signal generator operated by said motor adapted to generate a continuous tone during said duration of recording, and means comprising a circuit including contacts in said timer and connected to the speech circuit of said sound recording device for intermittently connecting said generator to said device to deliver said tone thereto at intervals during recording, said device continuing to record while both said timer and said generator are in operation.

18. Signalling apparatus for recording systems including a signal receiving device; a circuit including a relay controlled by said device; a circuit including an electric motor and a source of current therefor controlled by said relay to start and stop said motor, a recording phonograph having a speech circuit and driven by said motor; an amplifier connected to said speech circuit of said phonograph; a tone-signal generator including a movable current generating member operated by said motor; and means for intermittently applying current generated by said tone-signal generator to said phonograph and the circuits connected thereto.

19. Signalling apparatus for recording systems including in combination, a signal-receiving device; a circuit including a timer motor controlled by said device; contacts in said timer operated thereby; a circuit including an electric motor and said contacts in series whereby said motor is controlled by said timer; a recording phonograph driven by said electric motor and having a speech circuit; an amplifier connected to said speech circuit of phonograph; a tone-signal generator including a movable member operated by said timer motor; and means comprising a circuit including said generator and a second pair of contacts operated by said timer motor for intermittently applying current generated by said tone-signal generator to said phonograph and the speech circuit connected thereto.

20. Signalling apparatus for a recording phonograph having in combination, a phonograph; a motor for driving said phonograph; a tone-signal generator comprising a rotor mounted on the shaft of said motor, and a stator mounted on the frame of said motor, and means operated by said motor for intermittently connecting said tone-signal generator to said phonograph to record signals produced thereby on a record.

21. The combination as claimed in claim 20 including a telephone line circuit, and means operated by said motor for connecting said signal-tone generator to said telephone line circuit.

22. Signalling apparatus for a recording phonograph having in combination, a phonograph; a motor for driving said phonograph; a timer, a tone-signal generator comprising a rotor mounted on a shaft of said timer and a stator mounted on the frame of said timer, means operated by said timer for intermittently connecting said tone-signal generator to said phonograph to record signals produced thereby on a record; a source of current and means for connecting said source of current to said timer to operate the same.

23. The combination as claimed in claim 21 including a telephone line circuit, and means operated by said timer for connecting said signal-tone generator to said line circuit.

References Cited in the file of this patent

UNITED STATES PATENTS

| | | |
|---|---|---|
| 1,845,034 | Bickelhaupt | Feb. 16, 1932 |
| 2,455,956 | Snader | Dec. 14, 1948 |
| 2,528,459 | Thompson et al. | Oct. 31, 1950 |
| 2,529,636 | Smith, Jr. | Nov. 14, 1950 |
| 2,530,075 | Peterson | Nov. 14, 1950 |
| 2,531,203 | Galbreath | Nov. 21, 1950 |
| 2,539,565 | Beatty | Jan. 30, 1951 |
| 2,558,040 | Carter | June 26, 1951 |